United States Patent [19]
Baldwin et al.

[11] Patent Number: 5,623,342
[45] Date of Patent: Apr. 22, 1997

[54] RAMAN MICROSCOPE

[75] Inventors: Kurt J. Baldwin; Chunwei Cheng, both of Leeds; Ian P. Hayward, York; David N. Batchelder, Leeds, all of United Kingdom

[73] Assignee: Renishaw plc., Gloucestershire, United Kingdom

[21] Appl. No.: 656,691

[22] Filed: May 31, 1996

[30] Foreign Application Priority Data

Jun. 7, 1995 [GB] United Kingdom ............... 9511490

[51] Int. Cl.$^6$ ............................. G01J 3/44; G01N 21/65
[52] U.S. Cl. ................................. 356/301; 356/419
[58] Field of Search ............................ 356/301, 419

[56] References Cited

U.S. PATENT DOCUMENTS 4,081,215  3/1978  Penney et al. ............... 356/301

FOREIGN PATENT DOCUMENTS

| 0543578 | 5/1993 | European Pat. Off. . |
| WO90/07108 | 6/1990 | WIPO . |
| WO91/11703 | 8/1991 | WIPO ....................... 356/301 |

*Primary Examiner*—F. L. Evans
*Attorney, Agent, or Firm*—Oliff & Berridge

[57] ABSTRACT

In a Raman microscope, Raman scattered light from an illuminated area on a sample 10 is collected by an objective 12 and imaged by a lens 18 onto a detector in an image plane 20. A filter 16 selects only light of a desired Raman wavenumber shift. Since the tuning of this filter is sensitive to the angle of incidence, it is placed after the lens 18 instead of before it, and the distance from the objective 12 to the lens 18 is made substantially equal to the focal length of the lens 18. This ensures that chief rays 14A',14B' from different points on the sample 10 pass through the filter 16 at the same angle of incidence. The wavenumber selected by the filter is therefore the same for light from all points on the sample, which it would not be if the filter were placed before the lens 18.

9 Claims, 3 Drawing Sheets

5,623,342

RAMAN MICROSCOPE

FIELD OF THE INVENTION

This invention relates to spectroscopic apparatus. It can be used, for example, in a Raman microscope which forms an image of an area of a sample in Raman scattered light.

DESCRIPTION OF PRIOR ART

International Patent Application No. WO90/07108 and European Patent Application No. EP 543578 describe a Raman microscope of this type. This microscope is shown in simplified schematic form in FIG. 1 of the accompanying drawings. An area of a sample 10 is illuminated by laser light, producing a spectrum of Raman scattered light from each point in the illuminated area of the sample. A microscope objective lens 12 collimates the cone of rays emitted from each point in the illuminated area into a respective parallel beam, such as indicated at 14A,14B. The collimated beams pass through a dielectric bandpass filter 16, which is tunable by tilting it to adjust the angle of incidence. The filter 16 selects only light in a particular Raman band of interest, rejecting light of other wavenumbers. The beams 14A,14B are then focused by a lens 18, onto a suitable two-dimensional detector in an image plane 20, e.g. a charge-coupled device (CCD). An image is therefore formed of the illuminated area of the sample 10, in Raman scattered light having wavenumbers within the band selected by the filter 16.

A disadvantage of the above arrangement is that the collimated beams such as 14A,14B from different parts of the sample pass through the filter 16 at different angles of incidence. The passband of dielectric and similar filters varies significantly with the angle of incidence—indeed, this is the reason why the passband can be tuned by tilting the filter. It follows that the spectral position of the passband shifts with position on the sample. In other words, the passband transmitted in the beam 14A will be different from (for example) that of beam 14B.

In practice, this disadvantage can be hidden by using a filter 16 having a wide passband, so that the Raman peak to be studied always lies within this passband. Commercial embodiments of the system just described use filters with a bandwidth of 20cm$^{-1}$. Whilst useful, this clearly has the limitation that high spectral resolution is not possible. For example, if the sample has two or more closely spaced Raman peaks it is impossible to resolve them. Furthermore, if the sample has a large background luminescence, then the luminescence within the 20cm$^{-1}$ passband will not be filtered out and will degrade the signal to noise ratio of the detected Raman image.

SUMMARY OF THE INVENTION

The present invention seeks to provide arrangements in which a filter with a narrower passband can be used, if desired.

Spectroscopic apparatus according to a first aspect of the present invention comprises:

an objective for collecting a spectrum of scattered light from an illuminated area of a sample and producing therefrom a collimated beam;

a filter for selecting a part of the spectrum and rejecting the remainder of the spectrum, the filter being sensitive to the angle of incidence of the light thereon;

a lens or mirror for focusing an image of the illuminated area in the selected scattered light onto an image plane; and a detector in the image plane for detecting the image of the illuminated area;

wherein an optical path from the sample to the detector comprises at least a first portion in which the light is in said collimated beam, and a second portion in which the light is not collimated;

and wherein said filter is located in said second, non-collimated portion of the optical path.

Spectroscopic apparatus according to a second aspect of the present invention comprises:

an objective for collecting a spectrum of scattered light from an illuminated area of a sample;

a filter for selecting a part of the spectrum and rejecting the remainder of the spectrum, the filter being sensitive to the angle of incidence of the light thereon;

a lens or mirror for focusing an image of the illuminated area in the selected scattered light onto an image plane; and a detector in the image plane for detecting the image of the illuminated area;

characterised in that a chief ray from each point in the illuminated area is incident on the filter at an angle which is substantially the same as the angles of incidence of chief rays from other points in the illuminated area.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
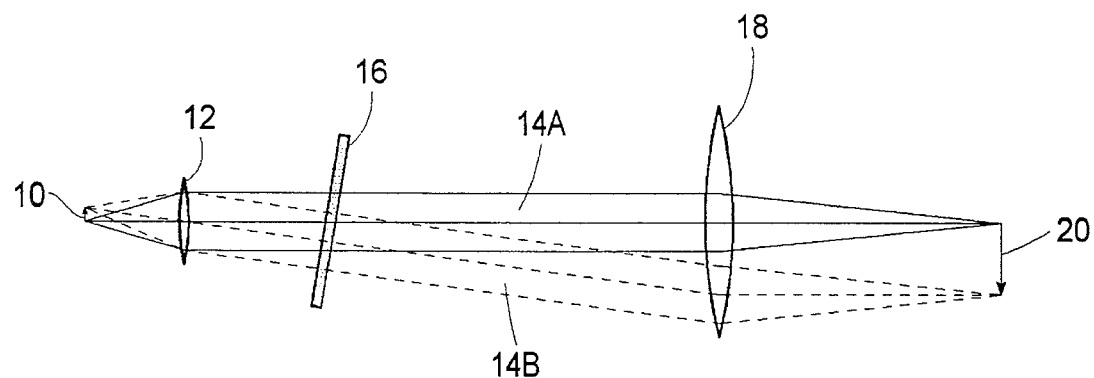
FIG. 1 is a simplified schematic diagram of a known Raman microscope system.
Figure 2:
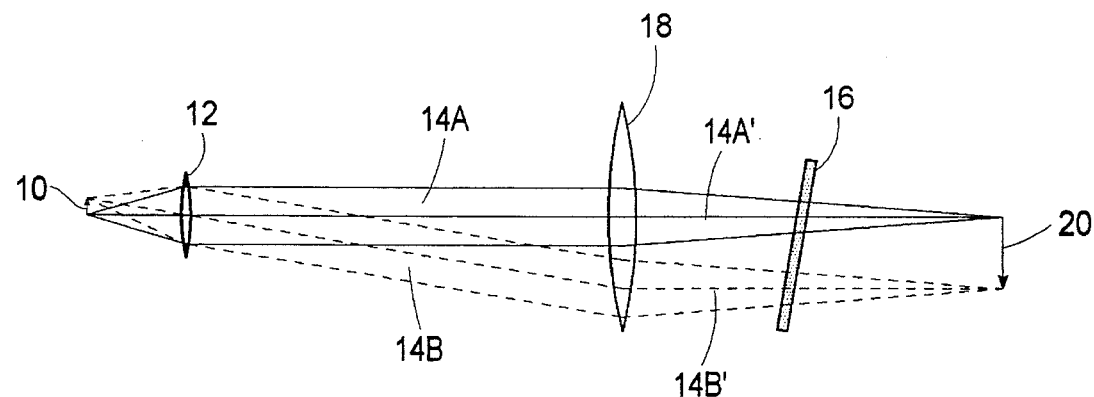
FIGS. 2 and 3 are corresponding diagrams of two Raman microscope systems which exemplify the present invention.
Figure 3:
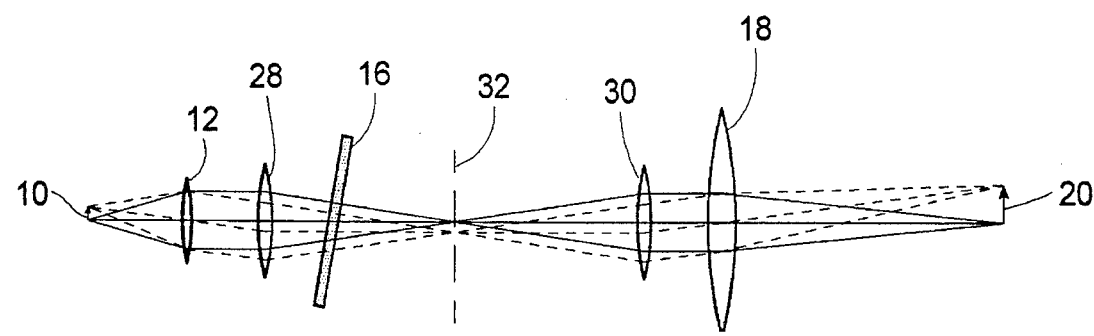

The systems of FIGS. 2 and 3 are modified versions of the system of FIG. 1, and the following description should be read in conjunction with the above-mentioned prior International and European Patent Applications and with the corresponding U.S. Pat. Nos. 5,194,912 and 5,442,438 which are incorporated herein by reference. For example, the arrangements for injecting the illuminating laser light, and for rejecting reflected and Rayleigh scattered light having the same frequency/wavenumber as the laser light, may be as described in those prior patent specifications. Other features mentioned in those prior patent specifications may also be incorporated into the present systems, if desired.

In FIG. 2, the system of FIG. 1 is modified by placing the filter 16 between the lens 18 and the image plane 20, that is, in the same "space" as the image. It will be seen that as a result, the chief rays (principal rays) 14A',14B' of the beams 14A,14B are brought substantially parallel to each other, and have substantially the same angle of incidence on the filter 16. The filter 16 therefore has substantially the same transmission characteristic (i.e. the same passband) for each of the chief rays from every point in the illuminated area of the object 10. In order to bring the chief rays 14A',14B' as parallel as possible, the distance between the lenses 12 and 18 should equal the focal length of the lens 18. However, deviation from this ideal may be tolerable in practice.

It is true that the other rays in the beam 14A are converging towards the focus as they pass through the filter 16; that is, not all the rays in the beam 14A have substantially the same angle of incidence on the filter 16. The same is true for the rays in the beam 14B, and in the beams from each other point in the illuminated area of the sample. If the filter 16 has a narrow passband (as desirable for high spectral resolution) then the detected image in the plane 20 will be dimmer owing to the large range of angles of the rays incident upon the passband filter: only a narrow cone of these rays will be transmitted by the filter. This can be compensated for by either increasing the nominal width of the passband, or by increasing the focal length of the lens next to the filter so that the angular spread of the cone of rays is smaller. It will be appreciated that it is possible to trade these two features off against each other. Increasing the focal length will allow a narrower passband and a higher spectral resolution (for a Raman peak of a given intensity and a detector of a given sensitivity) but the apparatus will no longer fit into such a small housing. Conversely, if the highest possible spectral resolution is of less importance, a smaller focal length lens can be used for the lens 18 and the apparatus will be more compact.

A related but different effect is as follows. If the filter 16 has a narrow nominal passband (for parallel light rays), it is nevertheless true that the apparent passband will be slightly wider. Consider light of a wavelength slightly to one side of the nominal passband. The chief rays 14A',14B' at this wavelength from each point in the sample 10 will be rejected by the filter, but some light at this wavelength in the rays converging towards the focus will be incident at an appropriate angle to enable it to be transmitted. A long focal length for the lens 18 will reduce this apparent broadening of the passband. Furthermore, the broadening increases with the angle of incidence of the light on the filter 16. For best results, therefore, normal incidence would be preferred, though this restricts the ability to fine tune the filter by tilting it.

In designing the system of FIG. 2, attention should be paid to the position of the effective aperture stop in the paths of the beams 14A,14B. In terms of classical optical design, the chief ray passes through the centre of the stop. For a practical system, the natural stop will be at the microscope objective 12, and the apertures of the other components (including the lens 18) should then be sufficiently large that they do not stop the beams further. This ensures that the chief rays are as illustrated in FIG. 2, and are brought parallel at the filter 16 as shown. It also helps to prevent vignetting in the resulting image.

Figure 4:
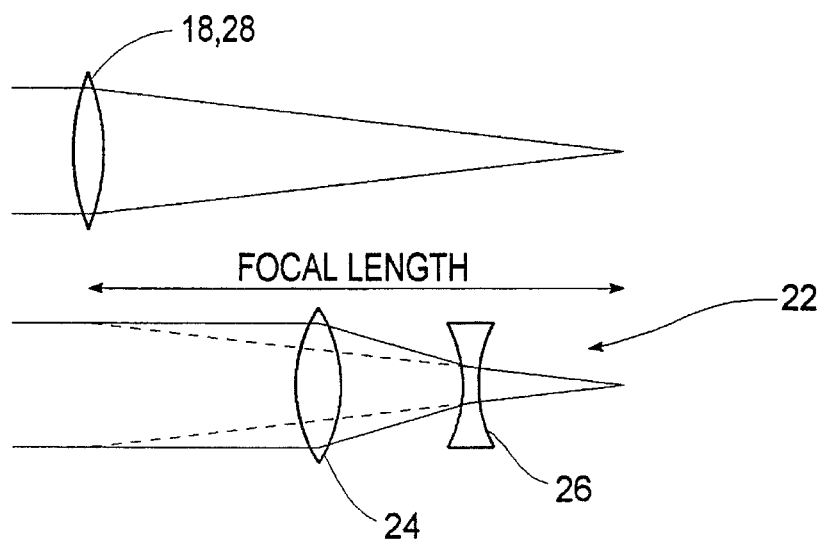
FIG. 4 is a schematic diagram showing how a telephoto lens system can be used in place of one of the lenses in FIGS. 2 and 3.

The apparatus of FIG. 2 can be modified as illustrated in FIG. 4. The long focal length lens 18 can be replaced by an equivalent telephoto lens 22, comprising (at least) a convex lens 24 and a concave lens 26. This achieves a long effective focal length, so that as much light as possible passes through the filter 16 in a narrow cone of rays, without requiring such a large housing. A possible side effect, however, is that the required aperture of the lenses in the system may increase, and this can increase aberrations.

FIG. 3 shows an alternative geometry which offers more scope for optimisation, and which is more readily adaptable to the existing commercial embodiment of FIG. 1 mentioned above. Compared with FIG. 1, the system of FIG. 3 uses two more lenses 28,30, and creates a further image plane 32 in the optical path. The filter 16 is placed between the lens 28,30, with the result that the chief rays from each point in the object have substantially the same angle of incidence on the filter, in the same manner as FIG. 2. The precise position of the filter between the lenses 28,30 is not especially important, although positioning it close to one of the lenses will help to remove any spatial variation in filter quality. However, when used in the existing commercial apparatus, the desirability not to change the existing position of the filter, coupled with the space restrictions and the need for long focal length lenses, may mean that the lenses 28,30 have to be positioned a long distance from the filter.

The design of the system of FIG. 3 should take into consideration similar points to that of FIG. 2. For example, it is desirable to space the lenses 12,28 by a distance equal to the focal length of the lens 28, and to consider the position of the effective aperture stop in the beam paths. The comments above about apparent broadening of the passband and the use of normal incidence on the filter 16 also apply.

The trade-off between the width of the passband of the filter 16 in FIG. 3 and the focal lengths of the lenses 28,30 is the same as in the system of FIG. 2. Thus, it can be advantageous to replace the lens 28 with an equivalent telephoto lens system 22 as shown in FIG. 4, achieving a longer effective focal length in a relatively short distance and reducing the size of the necessary housing. The lens 30 may similarly be replaced by a telephoto lens. As an alternative, the lenses 30 and 18 may be replaced by a single lens of the appropriate focal length.

Although the filter 16 has been placed in the converging light beams before the image plane 32 in FIG. 3, it may instead be placed in the diverging beams after this plane and before the lens 30.

Another possibility would be to place the filter 16 between the sample 10 and the objective 12, but this is not preferred for a variety of reasons. For example, the laser light for illuminating the sample could no longer be injected into the optical path as described in the above-mentioned prior International and European Patent Application, because it would be blocked by the filter. Separate illumination would therefore be required. Furthermore, the space required for the filter might necessitate a reduction in the numerical aperture and the amount of light collected by the objective.

Figure 6:
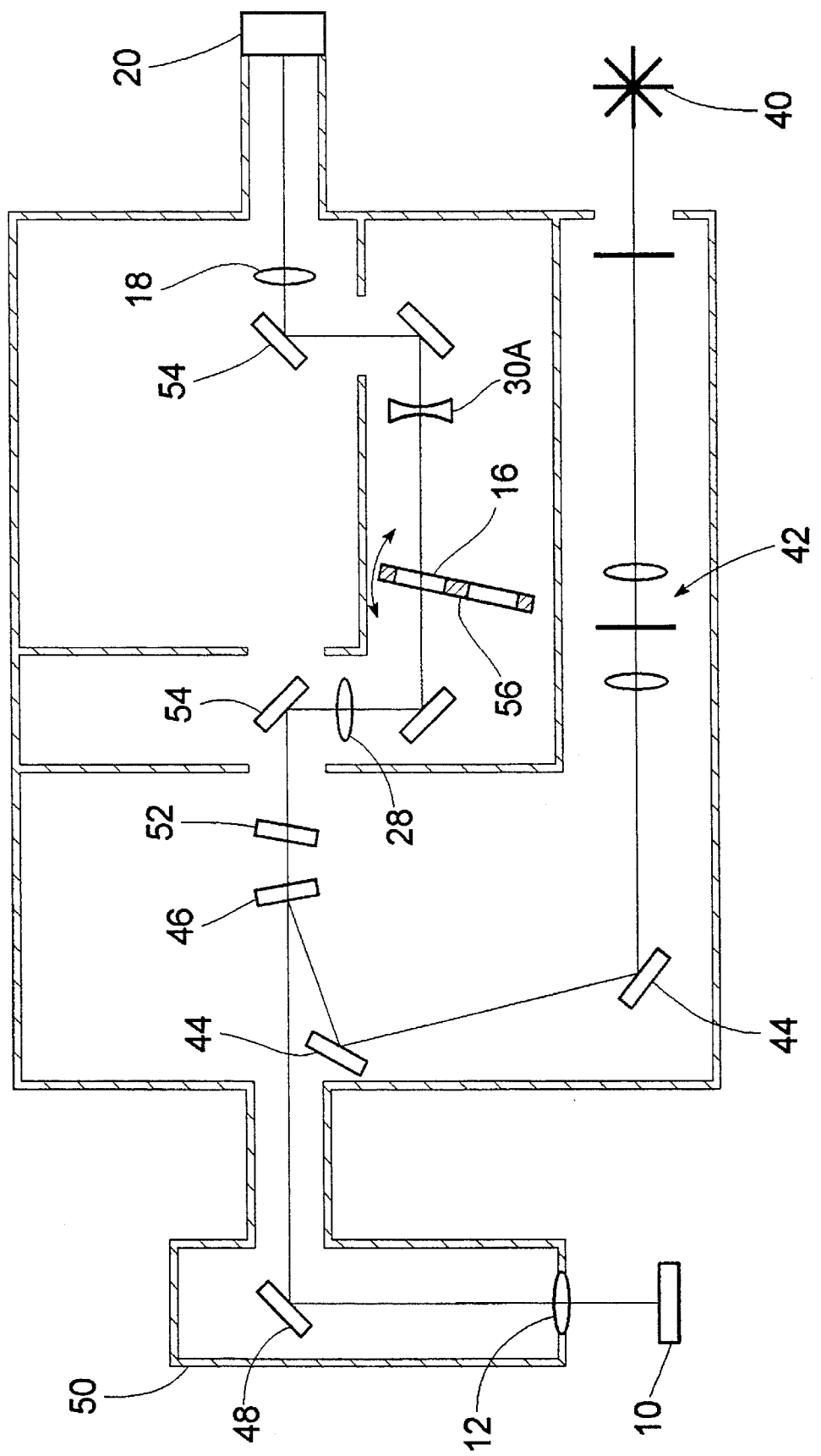
FIG. 6 is a schematic diagram of a third example of a Raman microscope system according to the present invention.

FIG. 6 shows a modification of FIG. 3, and the same reference numbers as in FIG. 3 have been used for elements which correspond. The modification is shown incorporated into a commercial system as described in European Patent Application No. EP 543578. Summarising the commercial system, illuminating light from a laser 40 passes through a spatial filter and defocusing lens system 42. It is reflected by mirrors 44 and a holographic filter 46 towards a microscope 50. Here, a mirror 48 reflects it through the microscope objective 12 to illuminate an area on the sample 10. Raman scattered light passes back via the objective 12 and mirror 48, and is transmitted by the holographic filter 46 (which also rejects light having the same wavelength as the laser).

Optionally, a further holographic filter 52 provides further rejection of the laser wavelength. Movable mirrors 54 are inserted into the optical path so that the Raman scattered light passes via the filter 16. This is provided in a filter wheel 56 which can be tilted to tune the filter, though the previous comments about the use of normal incidence to reduce apparent broadening of the filter passband still apply. An imaging lens 18 focuses an image of the illuminated area of the sample onto a CCD detector at 20.

As in FIG. 3, two extra lenses are inserted between the objective 12 and the imaging lens 18. One is a convex lens 28. For convenience in the existing commercial system, this is positioned approximately midway in the optical path between the objective 12 and the imaging lens 18, though this is not critical. This position enables a suitably long focal length without using a telephoto arrangement. The distance from the objective 12 to the lens 28 is equal to one focal length of the lens 28, as desired, and the arrangement would bring the collimated Raman scattered light to a focus close to the imaging lens 18. However, the second extra lens is a concave lens 30A, located after the filter 16, which recollimates the light so that it is correctly focused onto the CCD 20 by the existing lens 18 of the commercial system.

As in FIGS. 2 and 3, the light is converging as it passes through the filter 16, with the chief rays from each point on the sample being substantially parallel. Compared with the FIG. 3 arrangement, however, it will be seen that there is no real image plane 32, and that the use of the concave lens 30A enables the lens 28 to have a longer focal length. Compared with the existing commercial system, the extra lenses 28,30A also provide an increase in magnification.

As described, the systems of FIGS. 2,3 and 6 are capable of achieving high spectral resolution, because the reduction in the spread in the angles of the rays incident on the filter 16 means that higher resolution filters can be used. This can be especially useful with samples that have two or more closely spaced Raman signals, or to improve the signal to noise ratio of samples with a large background luminescence.

Figure 5:
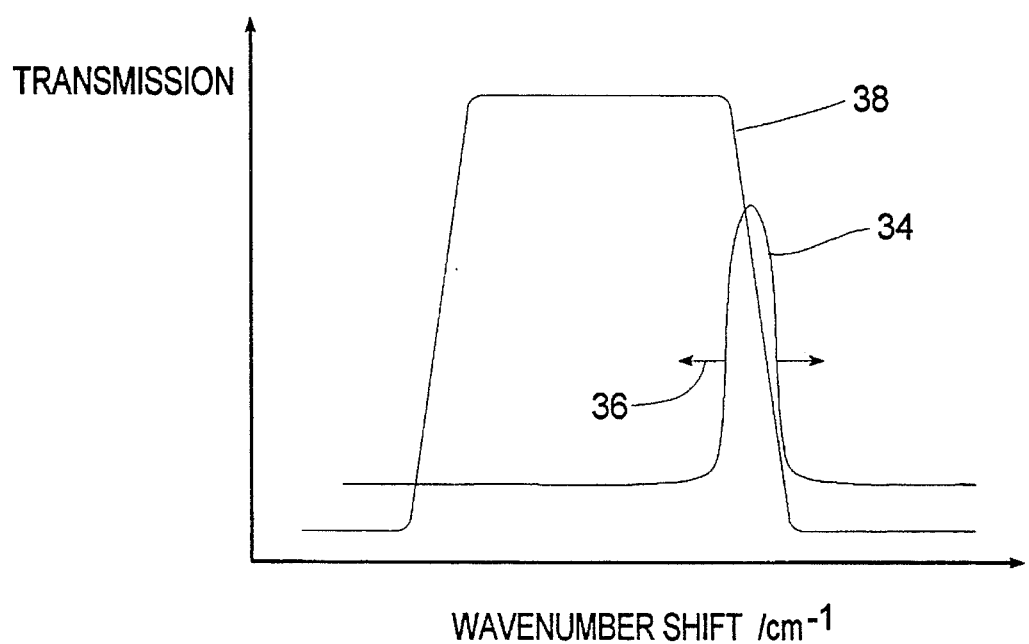
FIG. 5 is a graph of intensity/transmission against Raman wavenumber shift, showing one application of the preferred embodiments of the invention.

Another application is in stress imaging. It is well known that the spectral position of a Raman peak can be used as a measure of the stress in a sample. This can be transformed into intensity by using a well characterised edge of a bandpass or edge filter. If the spectral position of the transition between the reflection and transmission of the filter is positioned on a Raman peak (say by tilting the filter), then any variation in the position of the Raman peak will be observed as a change in the intensity of the image. This is illustrated in FIG. 5. A wavenumber shift of a Raman peak 34 changes in dependence on stress in the sample, as indicated by arrows 36. It is of course very interesting to study how this varies from point to point within the illuminated area of the sample. In order to observe this as a change of intensity at the various points, a suitable filter is used as the filter 16 in FIG. 2, FIG. 3 or FIG. 6, and is tuned so that a sharp edge 38 in its transmission characteristic coincides with the Raman peak 34. This effect is not possible with the imaging system shown in FIG. 1, since the spectral position of the edge must be constant across the image. A bandpass filter is preferred to an edge filter as the filter 16, because it will reject light from other bands which are of not interest in determining the stress. However, an edge filter—or even a band rejection (notch) filter—could be used.

Any variation in intensity of the Raman peak 34 across the area of the sample (e.g. caused by non-uniformity in the material content of the sample) can be removed by tilting the filter so that the Raman peak is always transmitted, irrespective of the stress. A second image is now taken: this is the normal Raman image of the illuminated area of the sample. A computer acquires the data for each point in the image for both the "stress image" and the normal Raman image, and divides the intensity at each point of the stress image by the intensity of the corresponding point in the normal Raman image. This normalises out the variation of intensity across the image.

Although a lens 18 is preferred in FIG. 2 for focusing the image onto the detector, a concave mirror could be used instead. Similarly, any of the other lenses in any of the systems described could be replaced by appropriate mirrors.

We claim:

1. Spectroscopic apparatus comprising:

an objective for collecting a spectrum of scattered light from an illuminated area of a sample and producing therefrom a collimated beam;

a filter for selecting a part of the spectrum and rejecting the remainder of the spectrum, the filter being sensitive to the angle of incidence of the light thereon;

a lens or mirror for focusing an image of the illuminated area in the selected scattered light onto an image plane; and a detector in the image plane for detecting the image of the illuminated area;

wherein an optical path from the sample to the detector comprises at least a first portion in which the light is in said collimated beam, and a second portion in which the light is not collimated;

and wherein said filter is located in said second, non-collimated portion of the optical path.

2. Spectroscopic apparatus according to claim 1, wherein a chief ray from each point in the illuminated area is incident on the filter at an angle which is substantially the same as the angles of incidence of chief rays from other points in the illuminated area.

3. Spectroscopic apparatus according to claim 1, wherein the second, non-collimated portion of the optical path, in which the filter is located, is between the detector and said lens or mirror for focusing an image thereon.

4. Spectroscopic apparatus according to claim 3, wherein said lens or mirror has a focal length substantially equal to the distance between the objective and said lens or mirror.

5. Spectroscopic apparatus according to claim 1, including a further lens or mirror for producing said second, non-collimated portion of the optical path.

6. Spectroscopic apparatus according to claim 5, wherein said further lens or mirror has a focal length substantially equal to the distance between the objective and said further lens or mirror.

7. Spectroscopic apparatus according to claim 3, wherein said lens or mirror comprises a telephoto arrangement.

8. Spectroscopic apparatus according to claim 5, wherein said further lens or mirror comprises a telephoto arrangement.

9. Spectroscopic apparatus comprising:

an objective for collecting a spectrum of scattered light from an illuminated area of a sample;

a filter for selecting a part of the spectrum and rejecting the remainder of the spectrum, the filter being sensitive to the angle of incidence of the light thereon;

a lens or mirror for focusing an image of the illuminated area in the selected scattered light onto an image plane; and a detector in the image plane for detecting the image of the illuminated area;

characterised in that a chief ray from each point in the illuminated area is incident on the filter at an angle which is substantially the same as the angles of incidence of chief rays from other points in the illuminated area.

* * * * *